March 14, 1961     A. DREIDING     2,974,425
MOLECULE DEMONSTRATOR FOR STEREOCHEMISTRY
Filed March 5, 1959     2 Sheets-Sheet 1
FIG. 1
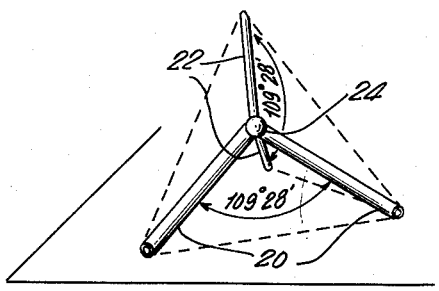
FIG. 2
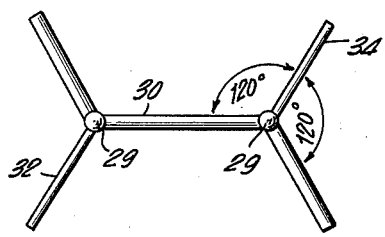
FIG. 3
FIG. 4
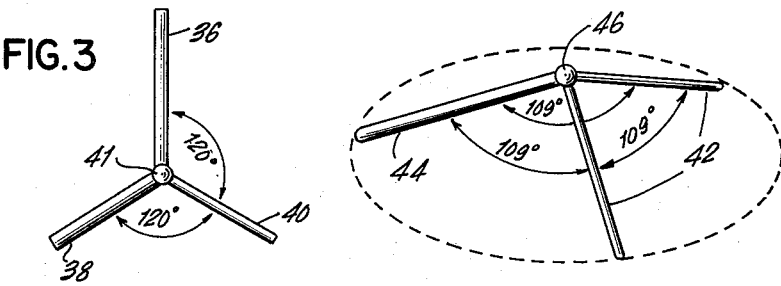
FIG. 5
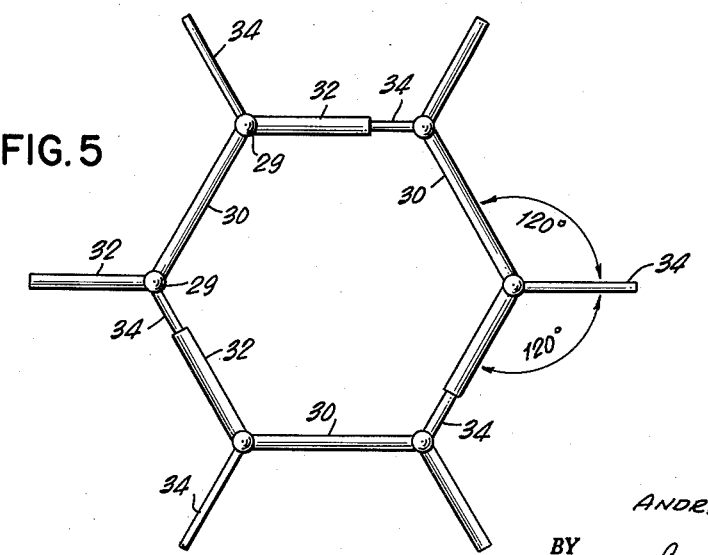
INVENTOR.
ANDRÉ DREIDING
BY
*Leon M. Strauss*
AGT.

March 14, 1961  A. DREIDING  2,974,425
MOLECULE DEMONSTRATOR FOR STEREOCHEMISTRY
Filed March 5, 1959  2 Sheets-Sheet 2

INVENTOR.
ANDRÉ DREIDING
BY Leon M. Strauss
AGT.

United States Patent Office 2,974,425
Patented Mar. 14, 1961

2,974,425
MOLECULE DEMONSTRATOR FOR STEREO-
CHEMISTRY
André Dreiding, Boglerenstrasse 2, Kusnacht,
Zurich, Switzerland
Filed Mar. 5, 1959, Ser. No. 797,360
2 Claims. (Cl. 35—18)

This invention relates generally to stereochemistry and more particularly to a novel demonstrator for exhibiting characteristics of a variety of molecules.

In the course of recent developments in the field of stereochemistry and in regard of the theory of reaction mechanisms it has been found to be quite advantageous to consider more specifically models and like devices for demonstrating molecular elements, which models are composed of single elements and in which only the central axes of bonds are represented by their characteristic lengths and spatial ratios.

In view of the omission of electron shells from the atoms the geometric proportional conditions may be considerably simplified as to survey thereof, afford neat grouping and easily comprehensible examination of such conditions.

A further advantage is that a quasi elastic rigidity and free rotation of simple bonds in the model assembly simulate more readily effective conditions in respective molecules.

It has been heretofore known to represent molecules by physical display of a centrally located atomic core or nucleus and by arranging rods of predetermined lengths which engage or are inserted in said nucleus. In order to reveal however different molecules, it became necessary to employ rods of different lengths which are selected in accordance with practical requirements and which are insertable in the body representing the nucleus of the respective atom.

The present invention concerns especially a demonstrator device, which is suitable for composing molecule models in which connector means are used which are joined to the nucleus of an atom and assume an angularity, which is characteristic of and corresponds to the nature and state of the respective atom, said connector means comprising rod-shaped and tubular means or members which are locked with each other at their location of attachment in such manner, that upon telescopic insertion of certain rod members of one element in tubular members of another element various models for molecules may be formed.

According to a preferred embodiment of the invention the dimensions of the tubular and rod-shaped members are selected as to their lengths and diameters so that said rod members have a tight, but rotatable telescopic fit in respective tubular members.

Two atom-presenting models of the aforesaid type may also be interconnected or assembled by any suitable elastic means, such as rubber tie, band or elastic spiral spring means, which may be wound around the tubular and rod-shaped members for connecting the central cores of two elements or devices with one another.

The tubular members and rod members of the respective atom-representing model have generally and suitably the same length which is characteristic of the respective atom, as for example, to demonstrate a predetermined distance of the hydrogen atom from the center point or core.

If the element is to be made up for its assembly with a selected model for a respective molecule or molecules, the atom centers should have a bond length characteristic of the distance of the atom nuclei to each other, then care is to be taken that the rod-shaped members and the tubular members upon their assembly exhibit a total length, which is to be readily predetermined.

To this end, the tubular members may be provided with respective engaging means, stops or abutments at a characteristic distance from their locations of fixed attachment corresponding to · the respective selected atom, whereby the tubular member may be pinched, contracted or filled up with a suitable material, so that the rod member of another atomic model may be inserted into and engaged by a respective tubular member to an extent, as is desirable, whereby telescopic interengagement of tubular and rod members afford the creation of composite connector means of greater length than the length of each single tubular and/or rod member per se.

It is also possible to equip the rod members with limit stops or fittings of any structure known per se, which define eventually the desired depth of penetration of the respective rod members into corresponding tubular members.

The demonstrator model thus devised may be advantageously used for demonstration of molecular characteristics of carbon compounds. It may present a single atom with its valences, but it offers also the possibility of constructing non-flexible atom groupings or assemblies, such as a C—C or C—O double bond, a trinominal or tetragonal ring, an Allen or a C—C triple bond as an entity, whereby the valences thereof are preferably displayed by tubular and rod-shaped members equal in number.

It is, therefore, one of the primary objects of the present invention to provide means facilitating easy and efficacious transformation of one type molecule presenting model to another for exhibition and like demonstration purposes.

It is another object of the invention to provide means affording telescopic interengagement of predetermined parts of molecule presenting models to a preselected extent, so as to obtain composite demonstration model or models exhibiting different molecule types.

Yet a further object of the invention resides in the provision of means engendering molecule presenting models of simplified construction and of great versatility and diversity.

Still another object of the present invention is to provide means contributing to inexpensive, highly educational and easily manipulatable and durable molecule demonstration means, whose effective parts in the form of tubular and rod-shaped members have such dimensions in regard to their length and diameter, that discernment thereof may not be easily had by an observer.

A still further object of the present invention is to provide means redounding to indicia or markings on said tubular and/or rod-shaped members for indicating the total distance inherent in a bond or linkage of making up another type of molecule which is built up from a single or basic molecule.

These and other objects of the invention will become further apparent from the following detailed description, reference being made to the accompanying drawing showing preferred embodiments of the invention.

Fig. 1 shows in perspective and seen from the top a model embodying the invention and presenting tetragonal carbon.

Fig. 2 demonstrates the model of an isolated carbon double-bond, as seen in top plan view.

Fig. 3 is a top plan view of a model presenting a carbonyl compound.

Fig. 4 exemplifies a prototype model of an aminonitride molecule.

Fig. 5 shows a benzol ring model composed of three aromatic double bond models derived from model seen in Fig. 2.

Figure 6:
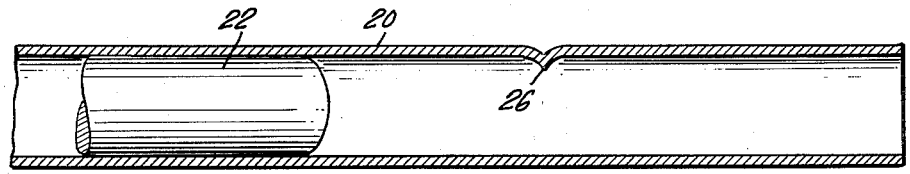
Fig. 6 is an enlarged fragmentary section indicating joined component parts of the models with the abutment or limit stops indicated.
Figure 7:
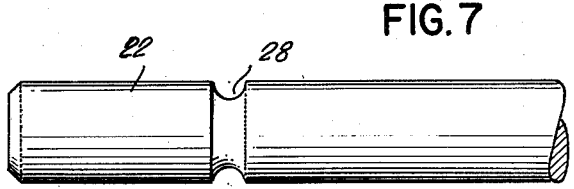
Fig. 7 is a fragmentary enlarged elevation of an end portion of one of the models.
Figure 8:
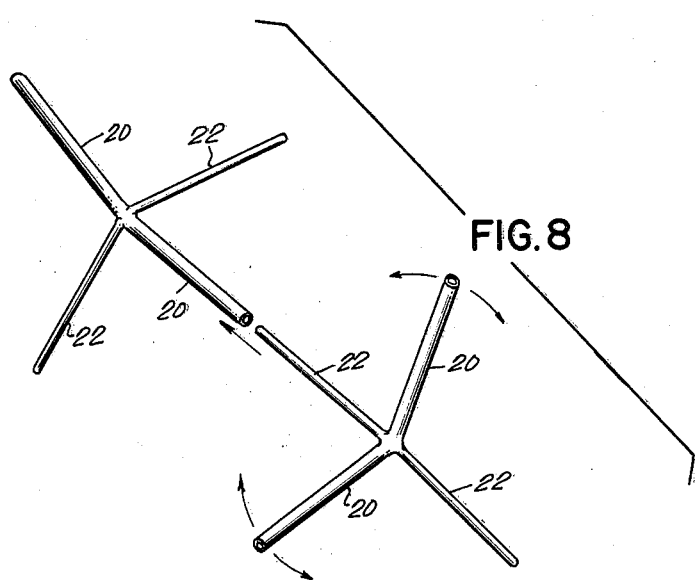
Fig. 8 is a perspective view indicating the models in position prior to their being joined together.

Referring now more particularly to the attached drawing, there is disclosed in Fig. 1, for example, the model of a tetragonal carbon composed of two tubular members 20 and two rod-shaped members 22 of a length amounting to $1.09e$ (whereby $e$ constitutes a selected unit of length), said members being arranged in fixed relation to each other and extending in predetermined angular relation, so that the location of attachment or fixation 24 coincides with the center of an equilateral tetrahedron. The corners of said tetrahedron are constituted by adjacent ends of the tubular members 20 and rod members 22. The rod and tubular members extend at an angle of 109°28' with respect to each other. Two tubular members possess each at a distance of $0.45e$ from their respective points of fixation a limit stop in the form of a reduction or contraction of area in diameter, so that a rod member of another and different element or device may be coupled with a respective selected tubular member by penetrating and telescoping into the latter to an extent of $0.64e$ unit length with the limit stop 26 seating in an abutment 28 in the rod member 22 if considered desirable. Otherwise the end of the rod member 22 abuts the limit stop 26.

The length of $1.09e$ of the links or connectors is calculated so that such length presents the distance of a hydrogen atom from the centrally disposed carbon atom.

Consequently, the model of tetravalent carbon atom represents also without any further addition or change a methane molecule.

Fig. 2 indicates a model modified to represent the isolated carbon double-bond. This model includes a central rod or tubular member 30 of a length of $1.33e$, at each end of tubular member 30 there extends both a rod member 32 and tubular member 34 of a length of $1.08e$, at respective angles of 120° to said central rod or tubular member. The abutment or like contraction provided within the tubular members and similar to stop 26 is located at a distance of $0.64e$ from the respective free ends of said members. Each carbon nucleus is indicated at 29.

Fig. 3 shows a model representing a carbonyl group consisting of a central rod 36 of $1.24e$ in length, at one end of which there is fixedly disposed tubular member 38 and rod member 40 of $1.08e$ in length at an angularity of 120°. Tubular member 38 possesses at a distance of $0.64e$ from its free end a limit stop similar to stop 26. The other end of the central rod represents an oxygen atom. The carbon nucleus is indicated at 41.

Fig. 4 shows the prototype of an amino-nitride molecule composed of two rod members 42 and a tubular member 44 having a length of $0.99e$, which are centrally affixed to each other at angles of 109° with respect to each other and at the nucleus 46.

Fig. 5 illustrates a benzene ring model composed of three aromatic double-bond models. These divisional or partial models distinguish from the other models herein described only in respect to their length measurements relative to isolated carbon double-bond. In the model of the aromatic double-bond (Fig. 2) the centrally disposed rod member has a length of $1.39e$ and the two branched rod members and tubular members have a length of $1.02e$. The tubular members are provided with an inner limit stop or like abutment (not shown) similar to stop 26 located at a distance of $0.65e$ from the respective end of the tubular member.

The walls of the tubular members are generally quite thin, so that the tubular and rod members will not possibly be distinguished exteriorly thereof, as they represent for all practical purposes equal values.

It is further well understood that the rod members, for instance, may carry on their surface markings, indicia or like means facilitating the telescopic engagement of one tubular member of a single or basic molecule with a rod member of the same type of molecule, to thereby obtain another type of molecule composed of predetermined tubular members and rod members, whereby the indicia carrying rod members may be readily employed in the preselection of the total length of a bond or linkage between two adjacent nuclei of the other type of molecule representing model.

It can thus be seen that there has been provided a molecule demonstrator comprising at least two molecule presenting models, each provided with a support forming nucleus representing a respective atom and further provided with lengthy single connector means extending at predetermined angles to each other from and anchored on said support, said single connector means of each model including tubular-shaped means, and rod-shaped means, at least predetermined ones of said connector means terminating in free ends, the free ends of said rod-shaped means of one of said models being telescopically engageable with corresponding free ends of said tubular-shaped means of another of said models, whereby said one model may be utilized to create with said other model a model assembly, thereby to exhibit a molecular element different from that of either of said two models.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A molecule demonstrator for use in stereochemistry; comprising at least two molecule presenting models, each provided with a support forming nucleus representing a respective atom and further provided with lengthy single connector means extending at predetermined angles to each other from and anchored on said support, said single connector means of each model including tubular members and rod-shaped members, at least predetermined ones of said connector means terminating in free ends, the free ends of said rod-shaped members of one of said models being telescopically engageable with corresponding free ends of said tubular members of another of said models so that said one model may be utilized to create with said other model a model assembly, thereby to exhibit a molecular element different from that of either of said two models, each of said tubular members being provided with a respective limit stop determining a distance characteristic of a bond so that, upon engagement of said rod-shaped members of said one model with corresponding tubular members of said other model, composite connector means are obtained, whose depth of interengagement determines a length for each composite connector means, which is greater than that of each of said single connector means.

2. A demonstrator according to claim 1, the diameter of said tubular members and of said rod-shaped members being so dimensioned, that said rod-shaped members tightly fit and rotatably engage respective tubular members.

References Cited in the file of this patent

UNITED STATES PATENTS 1,851,159     Dodge _____ Mar. 29, 1932

FOREIGN PATENTS 285,791     Great Britain _____ Oct. 18, 1928

OTHER REFERENCES

Chicago Apparatus Co., Catalog No. 55, copyrighted 1954, page 682 only. Article and Illustration on "Master Crystal Models."